US008226864B2

(12) United States Patent
Wano et al.

(10) Patent No.: US 8,226,864 B2
(45) **Date of Patent: *Jul. 24, 2012**

(54) METHOD OF MANUFACTURING POLYTETRAFLUOROETHYLENE PARTICLE AGGREGATE AND METHOD OF MANUFACTURING POLYTETRAFLUOROETHYLENE PRODUCT

(75) Inventors: Takashi Wano, Osaka (JP); Yuri Horie, Osaka (JP); Atsushi Tanaka, Osaka (JP); Osamu Tabei, Osaka (JP); Yozo Nagai, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,681

(22) Filed: Dec. 23, 2011

(65) Prior Publication Data

US 2012/0101215 A1 Apr. 26, 2012

Related U.S. Application Data

(63) Continuation of application No. 11/920,185, filed as application No. PCT/JP2006/309115 on May 1, 2006, now Pat. No. 8,105,515.

(30) Foreign Application Priority Data

May 12, 2005 (JP) ................................ 2005-140141

(51) Int. Cl.
*B01F 5/00* (2006.01)
*B01F 15/00* (2006.01)
*B29C 67/00* (2006.01)

(52) U.S. Cl. ................... 264/117; 366/137.1; 366/173.2

(58) Field of Classification Search .................. 264/117; 366/137.1, 173.2
See application file for complete search history.

(56) References Cited

U.S. PATENT DOCUMENTS

| | | | |
|---|---|---|---|
| 2,478,229 | A | 8/1949 | Berry |
| 2,685,707 | A | 8/1954 | Llewellyn et al. |
| 3,882,217 | A | 5/1975 | Banham et al. |
| 4,049,589 | A | 9/1977 | Sakane |
| 4,159,370 | A | 6/1979 | Koizumi et al. |
| 4,177,334 | A | 12/1979 | Okita |
| 4,225,547 | A | 9/1980 | Okita |
| 5,074,671 | A | 12/1991 | Roueche et al. |
| 5,148,806 | A | 9/1992 | Fukui et al. |
| 5,463,021 | A | 10/1995 | Beyer et al. |

(Continued)

FOREIGN PATENT DOCUMENTS

CN 1266397 9/2000

(Continued)

OTHER PUBLICATIONS

Satokawa ed. "Handbook for Fluororesin," Nikkan Kogyo Shimbun, Ltd., 1990, pp. 130 and 141-142. Partial English translation.

*Primary Examiner* — Yogendra Gupta
*Assistant Examiner* — Jeremiah Smith
(74) *Attorney, Agent, or Firm* — Hamre, Schumann, Mueller & Larson, P.C.

(57) ABSTRACT

The present invention provides a method of manufacturing a polytetrafluoroethylene (PTFE) product offering better productivity and a higher degree of flexibility in form of the product to be obtained than the conventional methods of manufacturing a PTFE product, and a method of manufacturing PTFE particle aggregate obtained as an intermediate while manufacturing a PTFE product. According to the manufacturing methods, aggregate of PTFE particles including water and a surfactant is obtained by applying force to a dispersion of PTFE particles containing PTFE particles, a surfactant and water as a dispersion medium, where the force makes the PTFE particles approach or contact with each other. Such a manufacturing method may be carried out, for example, with a chamber (1) shown in FIG. 1.

15 Claims, 5 Drawing Sheets

U.S. PATENT DOCUMENTS

| | | | |
|---|---|---|---|
| 5,516,209 | A | 5/1996 | Flint et al. |
| 6,174,473 | B1 | 1/2001 | Levy et al. |
| 6,270,707 | B1 | 8/2001 | Hori et al. |
| 6,440,559 | B1 | 8/2002 | Asano et al. |
| 2002/0161149 | A1 | 10/2002 | Kobayashi et al. |
| 2004/0026805 | A1 | 2/2004 | Cody et al. |
| 2009/0166929 | A1 | 7/2009 | Wano et al. |

FOREIGN PATENT DOCUMENTS

| | | |
|---|---|---|
| EP | 1 065 223 | 1/2001 |
| EP | 1 291 367 | 3/2003 |
| JP | 47-12332 | 6/1972 |
| JP | 5-112653 | 5/1993 |
| JP | 5-301267 | 11/1993 |
| JP | 6-192321 | 7/1994 |
| JP | 6-234865 | 8/1994 |
| JP | 7-290551 | 11/1995 |
| JP | 11-77787 | 3/1999 |
| JP | 11-246607 | 9/1999 |
| JP | 2002-201217 | 7/2002 |
| JP | 2002-308914 | 10/2002 |
| JP | 2002-370279 | 12/2002 |
| JP | 2003-522230 | 7/2003 |
| WO | 01/57096 | 8/2001 |

METHOD OF MANUFACTURING POLYTETRAFLUOROETHYLENE PARTICLE AGGREGATE AND METHOD OF MANUFACTURING POLYTETRAFLUOROETHYLENE PRODUCT

TECHNICAL FIELD

The present invention relates to a method of manufacturing aggregate of polytetrafluoroethylene (PTFE) particles and a method of manufacturing a PTFE product, both using a dispersion of PTFE particles as a starting material.

BACKGROUND ART

Since polytetrafluoroethylene (PTFE) has properties such as high chemical resistance and low conductivity, a high melting point and excellent heat resistance, it is used for variety of purposes mainly in chemical and electric fields. It is widely used for machinery purposes such as non-lubricant sliding components taking advantage of the property of a small friction coefficient or surface tension.

On the other hand, PTFE does not dissolve in most solvents except for specific solvents, and has the melting viscosity as high as in a range from $10^{10}$ Pa·s to $10^{11}$ Pa·s (from $10^{11}$ P to $10^{12}$ P) at a temperature of 380° C. Thus, various forming methods (such as extrusion and injection molding) used for forming general thermoplastic resin are not easily applied for manufacture of a PTFE product. These forming methods work with resin having melting viscosity upon formation generally in a range from $10^2$ Pa·s to $10^3$ Pa·s.

Conventionally, a method known as sinter forming is a common method of manufacturing a PTFE product. The sinter forming uses powdery PTFE particles as a starting material, and preforms at room temperature (forming aids may be added as needed at this point), and then the formed preform is heated at a temperature equal to or more than the melting point of PTFE (327° C.) for sintering (firing) the whole, and thus a PTFE product is obtained.

Steps for the sinter forming may be determined appropriately in detail according to the form of a product to be obtained, and for example, a PTFE product in a sheet form (a PTFE sheet) may be obtained by forming a cylindrical PTFE product (a PTFE block) by preforming and firing and then by cutting the outer periphery of the formed block (cutting method). Although a sheet with relatively large thickness (for example, not less than 25 μm) may be obtained according to this method, the block size has to be enlarged for manufacturing sheets efficiently. In that case, preforming and firing take a long time (approximately from two to five days, depending on the block size) to inhibit the development of defects such as cracks due to heat distortion. Moreover, sinter forming such as the cutting method is basically a batch process, and thus continuous manufacture of a PTFE product from a starting material is difficult.

Separately from the cutting method, casting also is known as a method of manufacturing a PTFE sheet. By casting, a dispersion of PTFE particles (a PTFE dispersion), which is a starting material, is applied on a support such as a metal plate and then dried and fired, followed by separating from the support for obtaining a PTFE sheet. According to this method, compared to the case of sinter forming, a PTFE sheet is obtained that is thinner and less distorted. The thickness of a sheet obtained by one procedure of application, drying and firing, however, is considered to have an upper limit of about 20 μm for inhibiting minute defects called mud cracks, and a sheet with a thickness above 20 μm has to be obtained by repeating the application and firing of the dispersion a plurality of times. In addition, a product having a form other than a sheet form is difficult to form by casting.

The cutting method, casting and other methods of manufacturing a PTFE product are described in, for example, "Handbook for Fluororesin" (Takaomi Satokawa, ed., published by Nikkan Kogyo Shimbun, Ltd. in 1990 (description for the cutting method on pages 141 to 142, for casting on page 130)).

DISCLOSURE OF THE INVENTION

Accordingly, conventional methods of manufacturing a PTFE product have limitations in improving productivity and in form of a product to be obtained. Thus, an object of the present invention is to provide a method of manufacturing a PTFE product offering better productivity and a higher degree of flexibility in form of the product to be obtained than the conventional methods of manufacturing a PTFE product, and a method of manufacturing PTFE particle aggregate obtained as an intermediate while manufacturing a PTFE product based on the manufacturing method of the present invention.

A method of manufacturing polytetrafluoroethylene (PTFE) particle aggregate of the present invention is a method of obtaining aggregate of PTFE particles including water and a surfactant by applying force to a dispersion of PTFE particles containing the water as a dispersion medium, the particles and the surfactant, the force making the particles approach or contact with each other.

A method of manufacturing a PTFE product of the present invention (a first manufacturing method) includes obtaining aggregate of PTFE particles by the method of manufacturing PTFE particle aggregate of the present invention, and reducing an amount of the water contained in the obtained aggregate.

Another method of manufacturing a PTFE product of the present invention from a different perspective from above (a second manufacturing method) includes the following steps (A), (B) and (C): (A) preparing a PTFE dispersion including water as a dispersion medium, PTFE particles of not less than 40 mass % and a surfactant, (B) producing aggregate by aggregating the PTFE particles in the PTFE dispersion by the surfactant under the condition of containing the water, and (C) shaping the aggregate.

According to the present invention, a PTFE product is manufactured with better productivity and the product to be obtained has a higher degree of flexibility in form than by conventional methods of manufacturing a PTFE product. In addition, according to the present invention, PTFE particle aggregate including water and a surfactant is obtained as an intermediate while manufacturing a PTFE product.

BEST MODE FOR CARRYING OUT THE INVENTION

Figure 1:
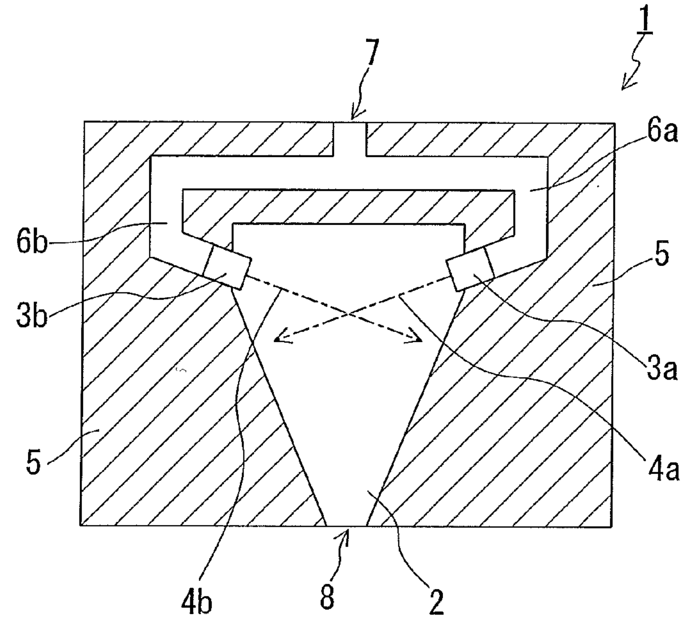
FIG. 1 is a schematic view showing an example of a chamber that can be used for a method of manufacturing PTFE particle aggregate of the present invention.

According to the method of manufacturing PTFE particle aggregate of the present invention, aggregate of PTFE particles (hereinafter, also referred to simply as "aggregate") is obtained that includes water as a dispersion medium and a surfactant. Such aggregate cannot be obtained even as an intermediate by a conventional method of manufacturing a PTFE product. For example, aggregate including water and a surfactant is not formed by casting in which a dispersion of PTFE particles (hereinafter, may be simply referred to as "a dispersion") is the starting material, the same as the manufacturing method of the present invention, because water is removed by drying while PTFE particles are kept to be dispersed.

In addition, according to the manufacturing method of the present invention, aggregate is obtained that has PTFE particles aggregated to the extent of maintaining a given form (having self-forming maintainability) and includes water to the extent of enabling the form to be deformable (having deformability). This aggregate is deformable basically in an arbitrary form before being dried or fired, and for example, a PTFE sheet is obtained by deforming the obtained aggregate in the form of a sheet and then drying and/or firing it.

The reason for obtaining such aggregate by the manufacturing method of the present invention is not clearly determined, but one possible explanation is that a mixed structure is formed in which the PTFE phase and the water phase mix with each other due to action of the surfactant in the dispersion. Although further studies are necessary to determine the aggregate structure in detail, a possible mechanism is considered to cause the aggregate exhibiting the self-forming maintainability due to the continuation, to some extent, of the PTFE phase formed by joining the PTFE particles with each other. In some cases, a tighter binding structure may be formed among the PTFE particles, or a network structure of PTFE may be formed due to fibrillization of a part of the PTFE particles. In addition, another possible mechanism is considered to cause the aggregate exhibiting deformability due to the stable presence of the water phase through the surfactant among the PTFE phases, which are hydrophobic.

The method of applying force to the dispersion for making the PTFE particles approach or contact with each other is not particularly limited, and for example, the following methods may be used.

A. Supplying the dispersion to a chamber to apply the force in the chamber.

B. Spraying the dispersion to a target in order to apply the force.

C. Making the dispersion to contact with a barrier disposed in a flow path of the dispersion and inhibiting a flow of the dispersion in order to apply the force.

The method A can use a pressure generated in the chamber due to the provision of the dispersion as the force to make the PTFE particles to further approach or contact with each other, and it also allows connecting a pipe (a first pipe) for discharging the aggregate formed in the chamber as described later.

To carry out the method A, the dispersion supplied to the chamber may be sprayed in the chamber (method A1) or passed through a narrowed space formed in the chamber (method A2).

The method A1 may be carried out by spraying the dispersion, for example, toward an inner wall of the chamber or a component placed in the chamber. When the dispersion collides with the inner wall or the component, the force is applied for making the PTFE particles to approach or contact with each other.

The method A1 enables the PTFE particles to collide with each other depending on the factors such as the structure and the shape of the chamber and the conditions for spraying the dispersion. The method A1 also can apply the force to make the PTFE particles to approach or contact with each other by colliding the aggregate formed in the chamber with the dispersion.

The dispersion may be sprayed through a nozzle having a spraying orifice, and the structure and the shape of the nozzle, for example the form of its spraying orifice, may be determined arbitrarily. Similarly, to carry out the method B, the dispersion may be sprayed through a nozzle having a spraying orifice. Although the target for the method B may be defined arbitrarily, the space to have the target disposed therein preferably is sealed to inhibit a scattering of the sprayed dispersion and to increase the proportion of the amount of obtained aggregate to the amount of sprayed dispersion.

The spray pressure for the dispersion may be determined arbitrarily according to the conditions such as the content of the PTFE particles and that of the surfactant in the dispersion and the shape and the inner volume of the chamber. It should be noted, though, that an excessively low spray pressure may cause difficulty in obtaining the aggregate.

The method A2 may be carried out without particularly limiting the shape of the narrowed space through which the dispersion passes, and for example, it may be in the form of a slit. The force to make the PTFE particles approach or contact with each other is applied to the dispersion when the dispersion passes through the slit.

The force may be applied to the dispersion by supplying the dispersion to the chamber through a plurality of feeders and then colliding the dispersions supplied from the plurality of feeders with each other in the chamber (method A3). According to the method A3, the PTFE particles may be collided with each other depending on the structure or the shape of the chamber and the collision method.

The dispersions may be collided with each other in the chamber, for example, by spraying each dispersion from a nozzle disposed at each end of the plurality of feeders. For this process, disposing at least two nozzles in the chamber to cross each direction of spray enables to collide the dispersions with each other more efficiently.

The method C may be carried out to apply the force by, for example, supplying the dispersion to a pipe having the barrier (a second pipe). When the dispersion passes through the barrier disposed in the flow path (the second pipe), the flow of the dispersion may be turbulent or the dispersion may be stagnant partly, causing generation of imbalanced pressures in the dispersion. Thus, the force is applied to the PTFE particles making them approach or contact with each other.

The barrier may be, for example, disposed inside the second pipe. The barrier also may be a bent portion or the narrowed space of the second pipe, and in this case, the method C is also described as a method of supplying the dispersion to the second pipe having the bent portion or the narrowed space and then applying the force to make the PTFE particles approach or contact with each other at the bent portion or the narrowed space.

The dispersion may be supplied to the second pipe by spraying the dispersion from the nozzle, and in this case, the force can be applied efficiently to the PTFE particles. The nozzle for spraying may be the same as that for the method A1, and the spray pressure of the dispersion may be determined arbitrarily according to the factors such as the content of the PTFE particles and that of the surfactant in the dispersion and the shape of the second pipe.

According to the method C, the PTFE particles may be collided with each other depending on the structure or the shape of the second pipe and the conditions for supplying the dispersion. The method C also can apply the force to make the PTFE particles approach or contact with each other by colliding the aggregate formed in the second pipe with the dispersion.

The shape, the inner diameter and the length of the second pipe and the shapes of the bent portion and the narrowed space are not particularly limited.

The methods from A1 through A3 and the method B and the method C are examples for the method of applying the force to the dispersion of PTFE particles for making the PTFE particles included in the dispersion approach or contact with each other, and the manufacturing method of the present invention is not limited to the cases using the methods listed above.

The structure of the chamber, including the shape and the inner volume, for applying the force to the dispersion is not particularly limited, and commercially available devices (such as "Ultimizer" manufactured by Sugino Machine) may be utilized. "Ultimizer" is originally an atomizing dispersion device for pulverizing and atomizing various materials, such as pigments, fillers and catalysts, and the application for obtaining aggregate of PTFE particles was found by the present inventors.

FIG. 1 shows an example of the chamber. A chamber 1 shown in FIG. 1 has an inside space 2 in an approximately conical shape, which is cut off in the periphery near the bottom face, and a pair of nozzles 3*a* and 3*b* for spraying dispersions are disposed in the periphery to have their spraying orifices facing the inside space 2. The nozzles 3*a* and 3*b* are located to direct respective spray directions 4*a* and 4*b* crossing each other. The dispersions can be supplied to the nozzles 3*a* and 3*b* from a feed opening 7 through feeders 6*a* and 6*b* formed inside of a structure 5 of the chamber 1. Near the apex of the inside space 2 in an approximately conical shape, an outlet 8 is formed to discharge aggregate formed in the chamber 1 (in the inside space 2). The form of the outlet 8 is not particularly limited, and for example, it may be in a circular form.

The chamber 1 shown in FIG. 1 supplies the pressurized dispersions to the nozzles 3*a* and 3*b* through the feed opening 7 and the feeders 6*a* and 6*b* to spray the dispersions into the inside space 2 for colliding with each other (the method A3 is realized). In addition, using a chamber 1 having a similar structure but provided with only one nozzle or controlled appropriately the spray directions 4*a* and 4*b* of the nozzles 3*a* and 3*b*, the dispersions can be sprayed into the inside space 2 for colliding with the inner wall of the chamber 1 (a wall of the inside space 2) (the method A1 is realized).

The chamber 1 preferably has a sealable structure, and sealing the chamber 1 as needed enables the force to be applied more efficiently to the dispersions. The chamber 1 may have an opening for pressure regulation as needed for regulating the pressure in the inside space 2, and the opening for pressure regulation may have, for example, a pressure regulator valve disposed therein. The same applies for each chamber 1 shown in from FIG. 2 to FIG. 4 below.

Figure 2:
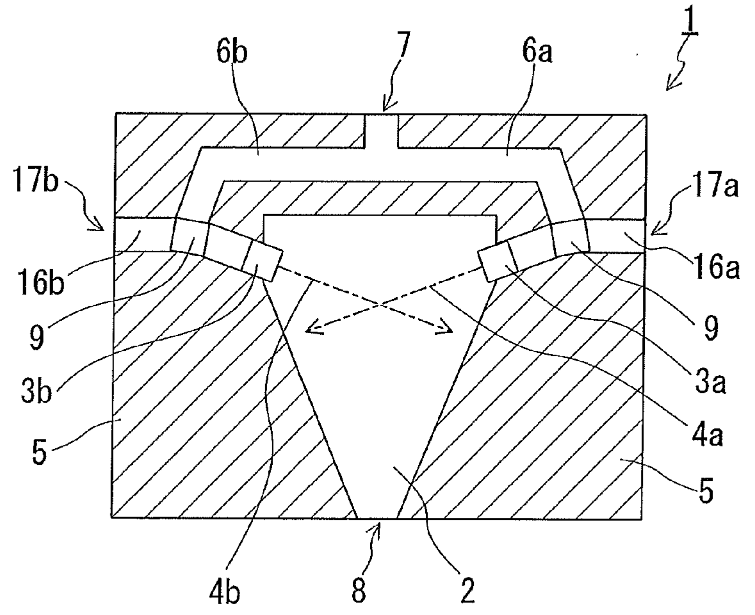
FIG. 2 is a schematic view showing another example of a chamber that can be used for a method of manufacturing PTFE particle aggregate of the present invention.

The method of supplying the pressurized dispersions to the nozzles 3*a* and 3*b* is not particularly limited, and for example, the undivided dispersion pressurized by a high pressure pump may be supplied from the feed opening 7. Using the chamber 1 as shown in FIG. 2, the dispersions and water pressurized by a pump (pressurized water) may be supplied to mixing valves 9 formed right in front of the nozzles 3*a* and 3*b* through separate feeders and then mixed with the mixing valve 9 to be supplied to the nozzles 3*a* and 3*b*. In the chamber 1 shown in FIG. 2, the pressurized water and the dispersions are supplied to the mixing valves 9, the pressurized water through the feed opening 7 and the feeders 6*a* and 6*b*, and the dispersions through the feed openings 17*a* and 17*b* and the feeders 16*a* and 16*b*.

Figure 3:
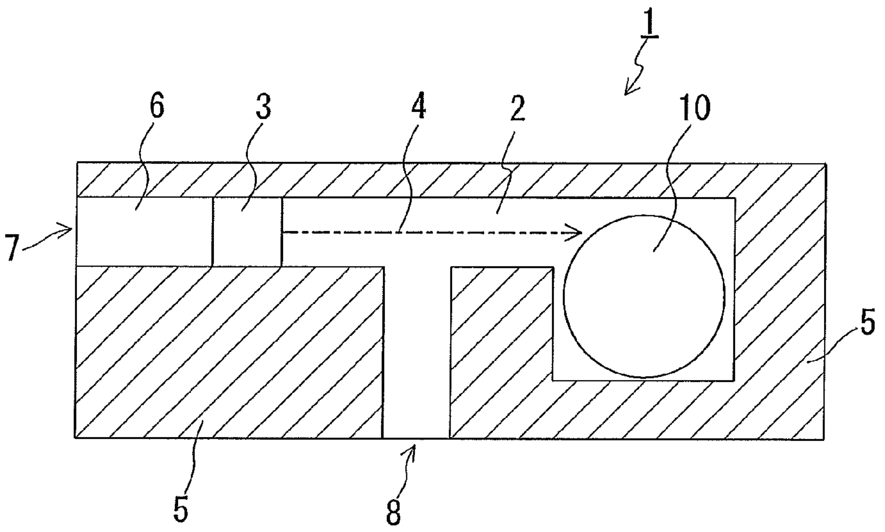
FIG. 3 is a schematic view showing still another example of a chamber that can be used for a method of manufacturing PTFE particle aggregate of the present invention.

FIG. 3 shows another example of the chamber. A chamber 1 shown in FIG. 3 has an inside space 2 where a freely rotatable sphere 10 is disposed at one end and a nozzle 3 for spraying the dispersion is disposed at the other end to have a spraying orifice of the nozzle 3 face the inside space 2. The nozzle 3 and the sphere 10 are located to direct a spray direction 4 of the nozzle 3 crossing with the sphere 10. The dispersion is supplied to the nozzle 3 from a feed opening 7 through a feeder 6 formed inside a structure 5 of the chamber 1. On a wall of the inside space 2 between the nozzle 3 and the sphere 10, an outlet 8 is formed to discharge aggregate formed in the chamber 1 (in the inside space 2).

The chamber 1 shown in FIG. 3 supplies a pressurized dispersion to the nozzle 3 through the feed opening 7 and the feeder 6 and the dispersion in the inside space 2 is sprayed for impacting the dispersion on the sphere 10, which is a component disposed in the chamber 1 (the method A1 is realized). For this operation, disposing the nozzle 3 and the sphere 10 such that a spray direction 4 of the nozzle 3 strays from the center of the sphere 10 for rotating the sphere 10 with a spray of the dispersion and inhibiting the abrasion inside the chamber 1 due to the collision of the dispersion.

The sphere 10 preferably employs a material not deformed by the collision of the dispersion, and for example, the sphere 10 may be made of a material, such as ceramic, metal (preferably alloys having higher hardness) or diamond.

Figure 4:
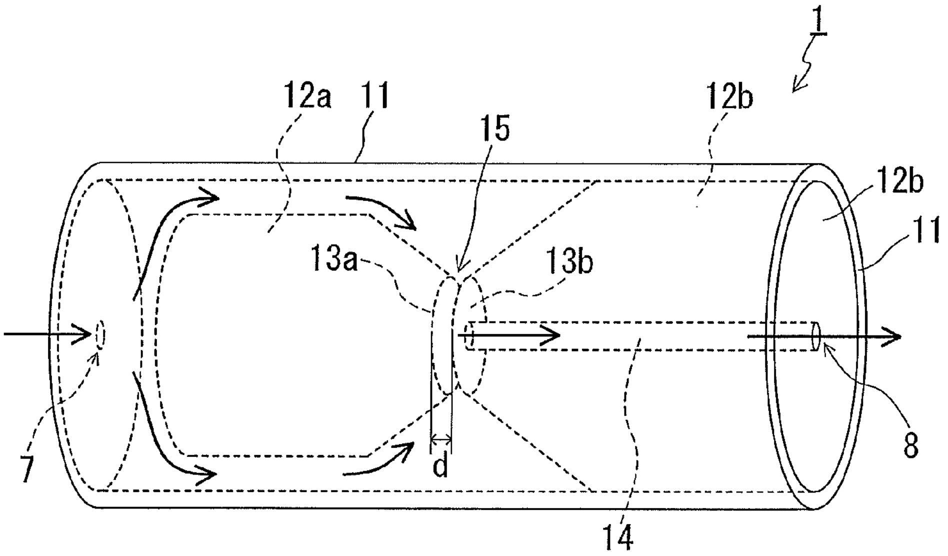
FIG. 4 is a schematic view showing yet another example of a chamber that can be used for a method of manufacturing PTFE particle aggregate of the present invention.

FIG. 4 shows another example of the chamber. A chamber 1 shown in FIG. 4 has a cylindrical outer case 11 having a pair of inner units 12*a* and 12*b* installed inside. Each of the inner units 12*a* and 12*b* has the shape of a truncated cone joined on one end of a cylindrical column, and upper faces 13*a* and 13*b* of the truncated cones of both inner units are disposed to face each other at a certain interval d. The central axes of the outer case 11 and the inner units 12*a* and 12*b* are substantially identical. At one end of the outer case 11, a feed opening 7 is formed to supply the dispersion. The inner unit 12*a*, the unit closer to the feed opening 7, has the outer diameter smaller than the inner diameter of the outer case 11, whereas the inner unit 12*b*, the unit farther from the feed opening 7, has the outer diameter identical to the inner diameter of the outer case 11. In addition, the inner unit 12*b* has an outlet channel 14 formed through the center of the upper face 13*b* and the inside of the inner unit 12*b* to the outside of the chamber 1. The inner unit 12*a* is supported by the outer case 11 through a support component (not shown).

Regulating the location of the inner units 12*a* and 12*b* for appropriately controlling the interval d enables a gap 15 to be defined between the upper faces 13*a* and 13*b* as the narrowed space in the form of a slit, and supplying the pressurized dispersion to the chamber 1 from the feed opening 7 enables the dispersion to pass through the narrowed space (the gap 15) disposed in the chamber (the method A2 is realized). The dispersion passes through the gap 15 and then pours into the outlet channel 14 to be discharged from an outlet 8 of the chamber 1 as aggregate of PTFE particles.

The pressure of the dispersion to be supplied (supply pressure) may be determined arbitrarily according to the shape and the inner volume of the chamber, the size of the interval d and the amount of the dispersion to be supplied. It should be noted, though, that the aggregate may be difficult to be obtained when the supply pressure is excessively low.

Each chamber 1 shown in FIGS. 1 to 4 preferably has a pipe (a first pipe) connected to the outlet 8 for discharging the aggregate from the connected pipe while keeping it in contact with the entire inner wall of the pipe. It enables to further apply force for making the PTFE particles approach or contact with each other when the aggregate discharged from the outlet 8 passes through the first pipe, and to obtain aggregate with more excellent self-forming maintainability and improved mechanical properties such as strength. Such aggregate also can be made into a product with improved mechanical properties such as strength, and for example, appropriately selecting the properties such as the shape, the inner diameter and the length of the first pipe enables to obtain a product having the tensile strength of not less than 1 MPa, in some cases not less than 2 MPa or than 2.5 MPa, in the MD direction (the direction of flow: the direction to be discharged from the pipe in this case) after drying. A possible explanation for the improvement in the strength of the aggregate and the product is that a skin layer in which the PTFE particles are more tightly joined to each other may be formed on the surfaces of the aggregate and the product when they pass through the first pipe. It also may be the case that the friction generated between the surfaces of the first pipe and the aggregate causes shear force inside the aggregate for promoting further binding and joining the PTFE particles themselves. Discharging the aggregate while keeping it in contact with the entire inner wall of the pipe may be enabled by appropriately selecting the form and the diameter of the outlet 8, the shape, the inner diameter and the length of the pipe.

The shape, the inner diameter and the length of the first pipe to be connected is not particularly limited, and they may be determined arbitrarily according to the shape and the inner volume of the chamber 1 and the amount of the dispersion supplied to the chamber 1. Since the self-forming maintainability and mechanical properties of the obtained aggregate basically tend to be more improved for a longer pipe, the length of the pipe is preferably greater than the minimum inner diameter of the pipe. As an example, when the processing speed of the dispersion is in a range from 0.1 L/min to 0.5 L/min, the inner diameter of the pipe connected to the chamber 1 may be in a range from 1 mm to 10 mm and the length of the pipe may be in a range from 1 mm to 5000 mm. In the case of the chamber 1 shown in FIG. 4, the outlet channel 14 may function as the pipe depending on the shape of the outlet channel 14.

In order to apply the force to the aggregate more efficiently, the minimum inner diameter of the first pipe is preferably equal to or less than the diameter of the outlet 8. The pipe also may have inner diameters varying with the distance from the outlet 8 (i.e. be tapered inside), and in this case, the inner diameter preferably becomes smaller with the distance from the outlet 8.

The temperature of the chamber 1 and the temperature of the dispersion supplied to the chamber 1 (processing temperature) are generally in a range from 0° C. to 100° C., preferably in a range from 25° C. to 80° C. and more preferably in a range from 25° C. to 50° C. In order to keep the processing temperature within the temperature range above, the chamber 1 may be provided with a cooling unit, as needed. Particularly when the chamber 1 has a structure in which the dispersion is sprayed in the inside space 2, the chamber preferably has a cooling unit because the temperature of the system is increased by spraying.

The aggregate obtained by the manufacturing method of the present invention, for example the aggregate discharged from the outlet 8 shown in FIGS. 1 to 4, further may be deformed. The deformed form and deforming method are not particularly limited, and for example, aggregate in a string form is obtained by passing through the first pipe and aggregate in a sheet form is obtained by passing through a slit. Alternately, the aggregate may be passed through various dies (spinnerets) used for extrusion, and aggregate may be obtained in various forms such as in the forms of a string and a sheet by appropriately selecting the shape of the die. The aggregate deformed in the form of a string or a sheet further may be subjected to deformation, for example by rolling.

The aggregate discharged from the second pipe used for the method C also may be deformed further as above.

Thus, according to the manufacturing method of the present invention, the form of the aggregate to be obtained offers a high degree of flexibility, and for example it is possible to obtain aggregate with the minimum thickness of not less than 20 μm, or above 20 μm depending on the manufacturing conditions, such as not less than 1 mm or not less than 2 cm. In contrast, it is possible to obtain aggregate with the maximum thickness of up to 5 cm. The thickness of aggregate means, for example, the diameter for aggregate in a string form and the thickness for aggregate in a sheet form.

The minimum thickness and the maximum thickness of the aggregate to be obtained are controlled by appropriately selecting the diameter of the outlet 8, the (minimum) inner diameter of the first pipe to be connected to the outlet 8, the (minimum) inner diameter of the second pipe and the shape of the die for deforming the aggregate. For example, connecting the first pipe with above 20 μm of the minimum inner diameter to the outlet 8 enables to obtain aggregate with above 20 μm of the maximum thickness (maximum diameter).

According to the manufacturing method of the present invention, applying the force continuously to the dispersion enables aggregate to be obtained continuously. That is, it realizes a continuous process, not a batch process. For example, the dispersion may be supplied continuously to the chamber 1 shown FIGS. 1 to 4 for discharging the aggregate continuously from the chamber 1. In this process, depending on the structure of the chamber 1, the mass of the dispersion supplied to the chamber 1 can be identical substantially to the mass of the aggregate discharged from the chamber 1.

For example, the dispersion also may be supplied continuously for the second pipe used for the method C to discharge the aggregate continuously from the second pipe. In this process, depending on the structure of the second pipe, the mass of the dispersion supplied to the second pipe can be identical substantially to the mass of the aggregate discharged from the second pipe.

Although the content of the PTFE particles in the dispersion is not particularly limited, it preferably falls within a range from 40 mass % to 70 mass % for obtaining aggregate with excellent balance of the self-forming maintainability and the deformability, more preferably a range from 50 mass % to 70 mass % and further preferably a range from 55 mass % to 70 mass %. Although depending on the method and conditions to apply the force to the dispersion, aggregate with improved self-forming maintainability is obtained basically with a greater content of the PTFE particles in the dispersion and aggregate with improved deformability is obtain basically with a smaller content of the PTFE particles.

The average particle diameter of the PTFE particles are generally in a range from 0.1 μm to 40 μm, and preferably in a range from 0.2 μm to 1 μm.

Although the content of the surfactant in the dispersion is not particularly limited, it preferably falls within a range from 0.01 mass % to 15 mass % for obtaining aggregate with excellent balance of the self-forming maintainability and the deformability, and more preferably within ranges from 0.1 mass % to 10 mass %, from 1 mass % to 9 mass % and from 2 mass % to 7 mass %, in this order. An excessively small content of the surfactant causes separation of the PTFE phase from the water phase, resulting in difficulty to obtain aggregate including water and the surfactant. An excessively large content of the surfactant makes it difficult to form the PTFE phase itself.

The type of surfactant is not particularly limited, and for example, an anionic surfactant having a hydrocarbon skeleton such as carboxylate, a nonionic surfactant such as a fluorine surfactant and a silicone surfactant may be used. A surfactant is preferably used that decomposes at a temperature near the melting point of PTFE, and in this case, the surfactant is decomposed when firing the obtained aggregate, and thus the amount of the surfactant may be successfully reduced that remains in the PTFE product formed by firing.

A commercially available PTFE dispersion may be used as the dispersion. The commercially available PTFE dispersion may employ, for example, the AD series such as AD938, AD911, AD912, AD1, AD639 and AD936 manufactured by Asahi Glass Co., Ltd. (formerly manufactured by Asahi Glass Fluoropolymers Co., Ltd.) and the D series such as D1, D2 and D3 manufactured by Daikin Industries Ltd. Such commercially available PTFE dispersions generally contain a surfactant.

The dispersion may contain substances other than PTFE particles, water and a surfactant.

The method of manufacturing a PTFE product according to the present invention (a first manufacturing method) includes a step of reducing the amount of water contained in the aggregate of PTFE particles obtained by the method described above (a drying step). A specific method for the drying step is not particularly limited, and for example, the obtained aggregate may be heated to temperatures in a range from 50° C. to 200° C. and maintained for a range from 1 minute to 60 minutes.

In addition, the first manufacturing method further may fire the aggregate after being subjected to the drying step (a firing step). A specific method for the firing step is not particularly limited, and for example, the aggregate after being subjected to the drying step may be placed in an electric furnace and then heated to temperatures equal to or higher than the melting point of PTFE (in a range from 327° C. to 400° C., preferably from 360° C. to 380° C.) and maintained for a range from 1 minute to 60 minutes. The time lengths for drying and firing may be determined appropriately according to the factors such as the thickness of the aggregate.

The PTFE product formed by the drying step, or the steps of drying and firing, may be a final product and further may be subjected to steps such as rolling and stretching as needed.

According to the first manufacturing method, the form of the product to be formed offers a high degree of flexibility. For example, a product can be formed with the minimum thickness of not less than 20 μm, or above 20 μm depending on the conditions of manufacturing the aggregate, such as not less than 1 mm or not less than 2 cm. In contrast, a product also can be formed with the maximum thickness of equal to or less than 5 cm.

In addition, the first manufacturing method enables PTFE products to be formed continuously, and it is a manufacturing method with better productivity than conventional manufacturing methods based on batch processes.

The PTFE particle aggregate obtained by the present invention may be understood as an intermediate formed during the steps for manufacturing a PTFE product, but it also can be distributed commercially in the state of aggregate.

According to the method of manufacturing a PTFE product of the present invention (a second manufacturing method), aggregate containing water, which is a dispersion medium in the PTFE dispersion, is obtained from the aggregation of the PTFE particles in the PTFE dispersion due to the emulsifying action of the surfactant, and this can be shaped into a predetermined form easily. Accordingly, it can be shaped easily in a sheet, and thus the number of steps can be reduced remarkably when compared to the conventional methods. Moreover, applying the second manufacturing method for manufacturing, for example, a PTFE sheet realizes stable production of a sheet having a desired thickness with less distortion, resulting in high productivity at a lower cost than conventional methods. The second manufacturing method does not require any special machine or facilities for aggregating PTFE particles but a general purpose machine or facilities may be applied as described later, and thus the method does not cause a disadvantage in costs.

A specific method for aggregating the PTFE particles using the second manufacturing method is preferably a method of making the PTFE particles approach each other forcibly with physical force. The following three methods are examples of such a method. These three methods may be used in combination. It should be noted that the second manufacturing method is not limited to these methods.

The first method to make the PTFE particles approach each other forcibly with the physical force is a method of spraying PTFE dispersions divided from the dispersion through at least two nozzles to collide with each other.

The second method to make the PTFE particles approach each other forcibly with physical force is a method of spraying the PTFE dispersion from a nozzle to collide with an object.

The third method to make the PTFE particles approach each other forcibly with physical force is a method of making the PTFE dispersion to flow in a flow path and to pass through a slit with a width narrower than that of the flow path at some midpoint in the flow path, and thus applying compression and shearing force.

In the second manufacturing method, the step (C) is preferably a step of extruding in the form of a sheet and then removing the dispersion medium in the aggregate.

In the second manufacturing method, the aggregate may be produced continuously in the step (B).

In the second manufacturing method, considering only the uniformity of the moisture upon aggregation, the concentration of the PTFE particles in the PTFE dispersion is not less than 40 mass %. When spraying the PTFE dispersion from a nozzle, the concentration of the PTFE particles in the PTFE dispersion is, for example, in a range from 40 mass % to 65 mass %, preferably from 50 mass % to 65 mass % and more preferably from 55 mass % to 65 mass %, considering both preventing aggregation of the PTFE particles before going through the nozzle and aggregating after spraying from the nozzle. Even when making the PTFE dispersion flow in the flow path and to pass through the slit with a width narrower than that of the flow path at some midpoint in the flow path, the concentration of the PTFE particles in the PTFE dispersion is in the same range as above.

In the second manufacturing method, the PTFE dispersion has to contain a surfactant for obtaining sufficiently soft aggregate by aggregating the PTFE particles under the condition of containing water. The type of surfactant is not particularly limited, and for example, it may be an anionic surfactant having a hydrocarbon skeleton such as carboxylate, and a nonionic surfactant such as a silicone surfactant and a fluorine surfactant. The surfactant preferably is decomposed at a temperature of the melting point of PTFE.

In the second manufacturing method, although the concentration of the surfactant in the PTFE dispersion is not particularly limited as long as it falls within a range allowing uniform aggregation, it is preferable to be in a range from 1 mass % to 10 mass %. Keeping this range prevents the failure to contain moisture uniformly due to the PTFE dispersion being hydrophobic for excessively low concentration of the surfactant, and from inhibiting the aggregation of the PTFE particles for excessively high concentration. The concentration of surfactant is more preferably in a range from 2 mass % to 9 mass %, and preferably in a range from 3 mass % to 7 mass %.

In the second manufacturing method, the PTFE dispersion may employ, for example, a commercially available PTFE dispersion containing a surfactant. Examples of the commercially available PTFE dispersion include PTFE dispersions under the trade names of AD938, AD911, AD912, AD1, AD639 and AD936 manufactured by Asahi Glass Fluoropolymers Co., Ltd. and PTFE dispersions under the trade names of D1, D2 and D3 manufactured by Daikin Industries Ltd.

In the second manufacturing method, the PTFE dispersion may include components other than a surfactant, as well as the surfactant. Examples of such components include fillers such as inorganic fillers, electrically conductive particles and titanium oxide. The filler may employ only a single type or a plurality of types in combination. In this case, the filler preferably is mixed well in the PTFE dispersion before the spraying process described later. This procedure enables the filler to be mixed more uniformly in the PTFE particles than conventional manufacturing methods, and thus it enables a PTFE product to be obtained with a filler dispersed uniformly.

The second manufacturing method is described below with examples.

The first example is a case in which the method of aggregating the PTFE particles is a method of spraying PTFE dispersions divided from the dispersion through at least two nozzles for collision. While a conventional manufacturing method by coating a PTFE dispersion causes minute defects known as mud cracks and has to limit a thickness per one course of application to no more than 0 μm, the present manufacturing method makes the PTFE particles bind with each other upon aggregation and does not develop cracks while firing so that it enables the thickness per one course of application to be increased, for example, up to 5 mm.

This example can employ, for example, a high pressure fluid spraying device. Examples of the high pressure fluid spraying devices include devices under the trade names of "Ultimizer" (middle size system), "Ultimizer" (large size system) and "Ultimizer" (for laboratory use) manufactured by Sugino Machine Ltd. The high pressure fluid spraying device is connected to a chamber for aggregating the PTFE particles. FIG. 1 is a cross sectional view illustrating an example of the structure of the chamber. As shown in the figure, the chamber includes a housing having an internal chamber and two nozzles 3*a* and 3*b* installed inside the housing. The housing is formed of a cylindrical main body (a structure 5) composing the internal chamber, a first plug (a feed opening 7) located at one end of the cylindrical main body to be an inlet for the PTFE dispersion, and a second plug (an outlet 8) located at the other end of the cylindrical main body to be a discharge opening for the aggregated PTFE dispersion. In this example, the two nozzles 3*a* and 3*b* are formed to face each other.

The PTFE dispersion is introduced to the first plug of the chamber by, for example, being pressurized directly by a high pressure pump. Instead of directly pressurizing the PTFE dispersion, the chamber may have two inlet plugs, one of which is a plug for introducing the PTFE dispersion and the other plug of which is for introducing high pressure water provided by a high pressure pump, for mixing the PTFE dispersion and the high pressure water inside the chamber. The PTFE dispersion introduced to the first plug is, as shown in the figure, divided into two flows by the internal chamber directed into two separate directions to be introduced into the two nozzles. The PTFE dispersion sprayed from the two nozzles collides at a point outside of each nozzle outlet. In FIG. 1, arrows show the flows of the PTFE dispersion.

The PTFE particles in the PTFE dispersion are aggregated due to the impact on the collision, and the aggregate having hydrophilicity due to the surfactant contained in the PTFE dispersion is mixed uniformly with the moisture around the aggregate, to become an adequately soft aggregate for being discharged from the second plug.

Although the pressure applied to the PTFE dispersion during the spraying process is not particularly limited as long as it falls within a range enabling uniform aggregate suitable for yielding the formation described later to be obtained, it may be, for example, not less than 100 MPa and preferably not less than 180 MPa. The upper limit may be, for example, 250 MPa though it is not particularly limited. Accordingly, the pressure may be, for example, in a range from 100 MPa to 250 MPa, and preferably in a range from 180 MPa to 250 MPa.

The processing temperature of the PTFE dispersion during the spraying process is, for example, up to 100° C., preferably in a range from 25° C. to 80° C., and more preferably in a range from 25° C. to 50° C. In this case, the increase in the temperature due to the collision energy is not considered.

Although the flow rate of the PTFE dispersion during the spraying process is not particularly limited as long as it falls within a range enabling the pressure above to be obtained, it may be, for example, in a range from 0.3 L/min to 30 L/min, preferably in a range from 0.4 L/min to 20 L/min and more preferably in a range from 0.5 L/min to 14 L/min.

Although the chamber shown in FIG. 1 has two nozzles, the chamber may include three or more nozzles and collide the PTFE dispersions sprayed from the nozzles with each other to obtain a desired flow rate. The number of the nozzles is not particularly limited.

In addition, the flow paths before the nozzles may have, for example, a filter such as a metal mesh imposed therein. This generates a turbulent flow in the flow paths for promoting the aggregation.

The nozzles have their heads made of, for example, diamond to prevent deformation due to the pressure during the processes. Although the nozzle diameter may be determined appropriately to obtain a desired pressure, it may be, for example, in a range from 0.05 mm to 0.5 mm.

The second plug may be connected with a flow path with a narrow diameter. Although the diameter (ϕ) of the flow path may be determined appropriately to apply an appropriate back pressure in the chamber according to the flow rate for generating a turbulent flow and to mix the aggregate uniformly with the moisture around the aggregate, it may be, for example, in a range from 1 mm to 5000 mm. The shape of the flow path may be tapered as the diameter (ϕ) becomes smaller with the flow of aggregate, as shown in FIG. 1. Such structure applies the back pressure in the chamber for generating a turbulent flow, and thus promotes the PTFE particles contacting with each other even more, resulting in further promoting the aggregation of the PTFE particles. In this case, the diameters (ϕ) of the flow path may be, for example, in a range from 1 mm to 100 mm at the supply area of the flow path (closer to the second plug) and, for example, in a range from 0.1 mm to 50 mm at the discharge area of the flow path.

The aggregate passed through the flow path is discharged, for example, in a sheet form via a die disposed at the end of the flow path. For this process, the aggregate may be shaped, for example, in a sheet form with a nozzle having the form of a slit. Upon shaping as such, the thickness of the sheet is preferably in a range from 10 μm to 5000 μm. In order to obtain easily a sheet having a desired thickness, it is preferred to determine each condition described above (such as the concentration of PTFE and that of the surfactant in the PTFE dispersion, the pressure and the processing temperature during the spraying process and the diameter (ϕ) of the flow path).

After drying the obtained sheet, the sheet is maintained at temperatures equal to or more than the melting point of PTFE and fired as needed, and thus a PTFE sheet is obtained. Upon drying as such, the drying temperatures are, for example, in a range from 80° C. to 200° C. and the drying time length is, for example, in a range from 1 minute to 60 minutes, and upon firing as such, the firing temperatures are, for example, in a range from 327° C. to 400° C. and the firing time length is, for example, in a range from 1 minute to 60 minutes.

Next, the second example is a case in which the method of aggregating the PTFE particles is a method of spraying the PTFE dispersion from a nozzle to collide with an object.

This example allows using, for example, the same high pressure fluid spraying device as that used for the first example. The chamber connected with the high pressure fluid spraying device, however, has a structure to collide the PTFE dispersion sprayed from a nozzle with an object. The nozzle may be single, different from the first example, and for example, the number may be in a range from one nozzle to five nozzles. The object may be, for example, a freely rotatable hard ball not to be deformed by collision of the PTFE dispersion. The hard ball may be, for example, a ceramic ball, a superalloy ball and a diamond ball. On receiving the collision of the PTFE dispersion, the hard ball disperses the fluid energy as components of force and rotates itself to consume the fluid energy. Other than the differences in the methods for aggregating the PTFE particles, the procedures are the same as the first example.

Then, the third example is a case in which the method of aggregating the PTFE particles is a method of flowing the PTFE dispersion in a flow path and making the PTFE dispersion pass through a slit with a width narrower than that of the flow path at some midpoint in the flow path, and thus applying compression and shearing force.

This example also allows using, for example, the same high pressure fluid spraying device as that used for the first example. The chamber to be connected with the high pressure fluid spraying device, however, has a structure with a slit, not with a nozzle. FIG. 4 shows an example of the structure of the chamber used for this example. As shown in the figure, this chamber includes a slit (a gap 15). In this example, pressure is applied to the PTFE dispersion and the PTFE dispersion is made to pass through the slit with a width narrower than that of the flow path at high speed. The slit is, for example, a slit in a disk form, and the cross-sectional area at the supply area of the slit is larger than that at the discharge area of the slit. Consequently, the PTFE particles in the PTFE dispersion are pressed on the particles themselves or the slit wall when the PTFE dispersion passes through the slit, and thus compression and shearing force are applied to promote aggregation of the PTFE particles. In the chamber shown in FIG. 4, the slit width of the slit is not particularly limited. In order to obtain the desired aggregate, however, the PTFE dispersion has to be applied at a high pressure and to pass through the slit at high speed, and thus the slit width is determined preferably to enable the desired pressure to be obtained according to the capacity of the pump to be used. The slit width of the slit is, for example, up to 1 mm and preferably up to 0.5 mm. Although the lower limit of the slit width of the slit is not particularly limited, it may be, for example, 1 μm and preferably 10 μm. Accordingly, the slit width of the slit is, for example, in a range from 1 μm to 1 mm and preferably in a range from 10 μm to 0.5 mm. The slit is made of, for example, diamond to be resistant to high pressure. Other than making the dispersion pass through the slit, the procedures are the same as the first example. In FIG. 4, arrows show flows of the PTFE dispersion. In the second manufacturing method, the thickness of a sheet obtained by one procedure of extrusion is preferably up to 300 μm considering the physical properties of the sheet after firing. For obtaining a sheet having a thickness more than that, it is preferred to extrude a plurality of times. The thickness of a sheet obtained by one procedure of extrusion is more preferably up to 200 μm.

Although the first to the third examples describe methods of manufacturing a PTFE sheet, the second manufacturing method is not limited to them, and for example, it is applicable to manufacture various forms of PTFE products such as a continued product of PTFE in a string form.

EXAMPLES

Hereinafter, the present invention is described more in detail with Examples. The present invention is not limited to the following examples.

Example 1

In Example 1, AD938 (60 mass % of the content of the PTFE particles, 3 mass % of the content of the surfactant, and 0.3 μm of the average particle diameter of PTFE particles) manufactured by Asahi Glass Co., Ltd., a commercially available PTFE dispersion, was employed for the dispersion. Aggregate in a sheet form was formed with the chamber 1 shown in FIG. 1, and the formed aggregate was dried and fired to fabricate a PTFE sheet.

The volume of the inside space 2 of the chamber 1 (the inner volume of the chamber 1) was 200 $cm^3$, a pair of nozzles **3*a* and 3*b* were disposed in the chamber each having a circular spraying orifice (0.25 mmϕ). Diamond was used for the part where a spraying orifice was formed at the nozzle head, and the nozzles 3*a* and 3*b* were disposed to cross the respective spraying directions 4*a* and 4*b* of the nozzles with each other. The outlet 8** (in a circular form, diameter of 10 mm) was connected with a pipe (a first pipe) having a cross section in a circular form, an inner diameter of 10 mm and a length of 1000 mm.

The dispersion was supplied to such chamber 1, the dispersion was sprayed from the nozzles **3*a* and 3*b* at the spray pressure of 200 MPa. The amount of the supplied dispersion was approximately 3 L/min, the temperature of the chamber 1** and the dispersion (processing temperature) was at a temperature of 25° C.

Several seconds after spraying, PTFE particle aggregate in the form of a string (in a cylindrical shape) was discharged from the head of the pipe. The discharged aggregate included water and the surfactant, and it successfully maintained the form without a support.

Consequently, a T-die (a die width of 320 μm) to shape the aggregate in a sheet form was connected on an end face of the pipe on the other side of the end face connected to the outlet 8, and the dispersion was sprayed from the nozzles 3*a* and 3*b* in the same manner as above. The dispersion was continuously supplied to the chamber 1, and a piece of aluminum foil was disposed under the discharge opening of the T-die as a support continuously receiving the aggregate discharged from the die and was moved at a speed of 2 m/min.

Several seconds after spraying, aggregate shaped in a sheet form (5 cm in width and 500 μm in thickness) was discharged continuously on the aluminum foil from the die. The discharged aggregate included water and a surfactant, and successfully maintained the form without the aluminum foil as a support. After that, the obtained aggregate was dried at a temperature of 90° C. for 15 minutes, followed by firing at a temperature of 370° C. for 10 minutes, and thus a PTFE sheet was obtained that has a uniform thickness without developing cracks (350 μm in thickness).

Similar experiments were carried out by varying the diameter of the spraying orifice of the nozzle in a range from 0.05 mmφ to 0.5 mmφ, the spray pressure in a range from 100 MPa to 300 MPa and the amount of the supplied dispersion in a range from 0.3 L/min to 30 L/min, and similar PTFE sheets were fabricated.

Example 2

In Example 2, AD938 manufactured by Asahi Glass Co., Ltd. was employed for the dispersion. Aggregate in a string form was formed with the chamber 1 shown in FIG. 4, and the formed aggregate was dried and fired to fabricate a PTFE product in a string form.

The inner volume of the chamber 1 was 200 $cm^3$, and the interval d of the narrowed space in the form of a slit was 0.1 mm by controlling the location of the inner units 12*a* and 12*b*. The outlet 8 (in a circular form, 10 mm of diameter) was connected with a pipe (a first pipe) having the cross section in a circular form, the inner diameter of 1.6 mm and the length of 200 mm.

The dispersion pressurized at 245 MPa was supplied to the chamber 1. The amount of the supplied dispersion was approximately 0.5 L/min and the processing temperature was at a temperature of 25° C.

Several seconds after supplying the dispersion, PTFE particle aggregate in a string form (in a cylindrical shape) was discharged from the pipe head. The discharged aggregate included water and a surfactant, and successfully maintained the form without a support. Consequently, the obtained aggregate was dried at a temperature of 90° C. for 30 minutes and then fired at a temperature of 370° C. for 20 minutes, and thus a PTFE product in a string form (in a cylindrical shape) (1.7 mm of diameter) without developing cracks was obtained.

Similar experiments were carried out by varying the supply pressure of the dispersion in a range from 100 MPa to 300 MPa and the interval d in a range from 1 μm to 1 mm, and thus similar PTFE products were successfully fabricated.

Example 3

Figure 5:
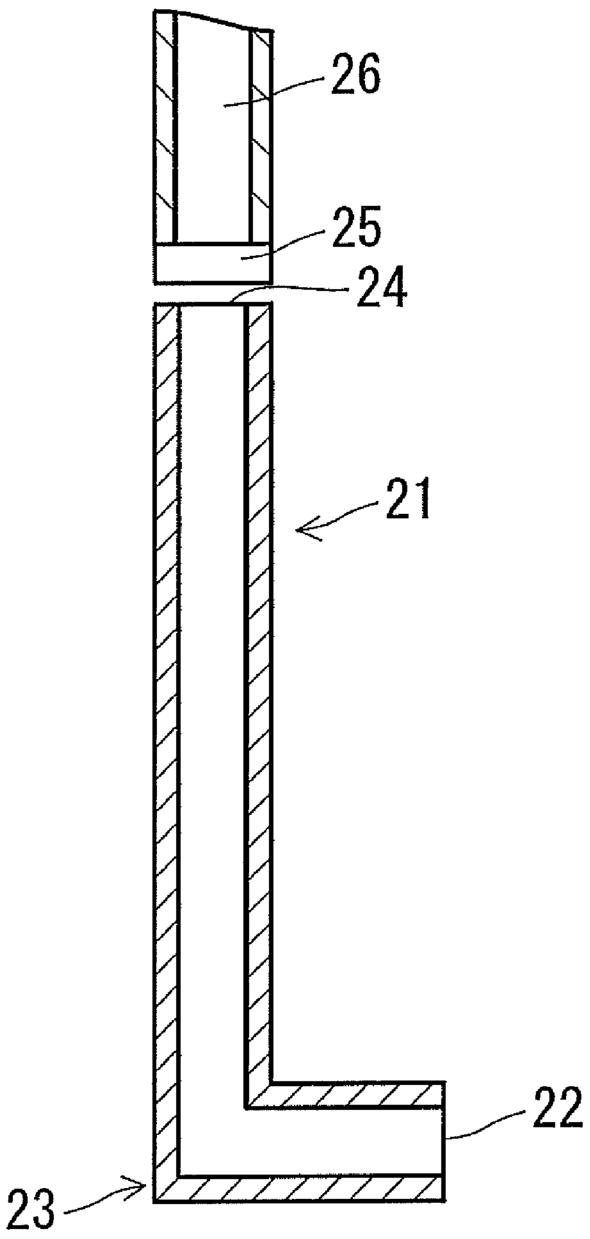
FIG. 5 is a schematic view for illustrating a second pipe used in an Example and a method of forming PTFE particle aggregate with the second pipe.

In Example 3, AD938 manufactured by Asahi Glass Co., Ltd. was employed for the dispersion. PTFE aggregate in a string form was formed with a pipe (a second pipe) 21 shown in FIG. 5. The pipe 21 had a bent portion 23 in the form of the letter L near one end 22 of the pipe 21 as a barrier inhibiting the flow of the dispersion. The pipe 21 has the inner diameter of 10 mm and the length 200 mm, and the bent portion 23 was located at a distance of 30 mm from the end 22 of the pipe 21.

A nozzle 25 (having a circular spraying orifice (0.15 mmφ)) disposed at the end of the feeder 26 of the dispersion was located on the central axis of the pipe 21 described above. The nozzle 25 and the pipe 21 were disposed so that the other end 24 of the pipe 21 and the nozzle 25 were 5 mm distant from each other (refer to FIG. 5), and then the dispersion was sprayed inside the pipe 21 from the nozzle 25 at the spray pressure of 20 MPa. The amount of the dispersion supplied to the nozzle 25 was approximately 0.5 L/min and the temperature of the dispersion was 25° C.

Several seconds after spraying, PTFE particle aggregate in a string form was discharged from the one end 22 of the pipe 21. The discharged aggregate included water and a surfactant, and successfully maintained the form without a support.

Similar experiments were carried out by varying the spray pressure of the dispersion, and the PTFE particle aggregate in a string form described above was obtained successfully even in the cases of the spray pressure at 25 MPa and 31 MPa.

In addition, similar experiments were carried out by varying the content of PTFE particles in the dispersion, and the PTFE particle aggregate in a string form described above was successfully obtained even in the cases of the content of 54 mass % and 48 mass %.

Example 4

Figure 6:
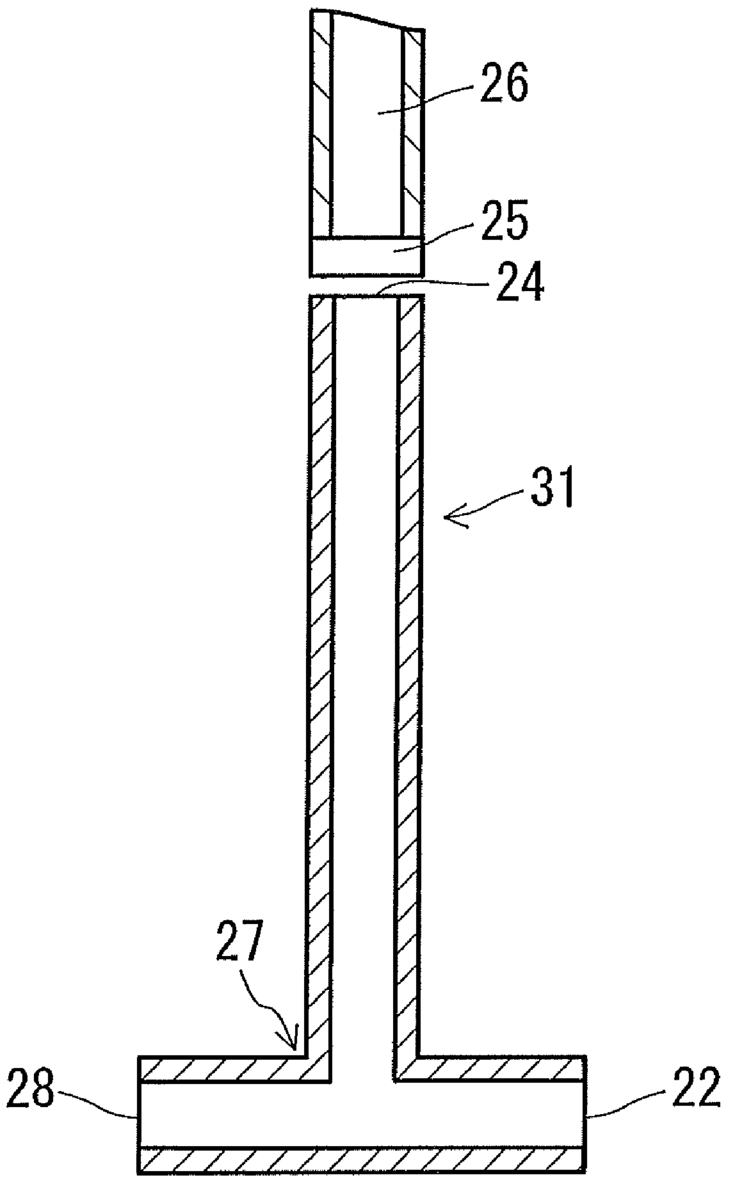
FIG. 6 is a schematic view for illustrating a second pipe used in an Example and a method of forming PTFE particle aggregate with the second pipe.

In Example 4, AD938 manufactured by Asahi Glass Co., Ltd. was employed for the dispersion. PTFE aggregate in a string form was formed with a pipe 31 (a second pipe) shown in FIG. 6. The pipe 31 had a bent portion 27 in the shape of the letter T near one end 22 of the pipe 31 as a barrier inhibiting the flow of the dispersion. The inner diameter of the pipe 31 was 10 mm and the length (the length from the one end 22 to the other end 24) was 200 mm, and the bent portion 27 was located 30 mm distant from the one end of the pipe 31.

A nozzle 25 (having a circular spraying orifice (0.15 mmφ)) disposed at the end of the feeder 26 of the dispersion was located on the central axis of the pipe 31 described above. The nozzle 25 and the pipe 31 were disposed so that the other end 24 of the pipe 31 and the nozzle 25 were 5 mm distant from each other (refer to FIG. 6), and then the dispersion was sprayed inside the pipe 31 from the nozzle 25 at the spray pressure of 31 MPa. The amount of the dispersion supplied to the nozzle 25 was approximately 0.5 L/min and the temperature of the dispersion was at a temperature of 25° C.

Several seconds after spraying, PTFE particle aggregate in a string form was discharged from the one end 22 of the pipe 31. The discharged aggregate included water and a surfactant, and successfully maintained the form without a support. During this process, the PTFE particle aggregate in a string form was not discharged from the end 28 composing the open ends of the "T letter" part together with the end 22. The spraying procedure was carried out a plurality of times, and all results showed that the PTFE particle aggregate in a string form was discharged from either one of the end 22 or the end 28.

Similar experiments were carried out by varying the spray pressure of the dispersion, and the PTFE particle aggregate in a string form was obtained successfully even in the case of the spray pressure at 25 MPa.

In addition, similar experiments were carried out by varying the content of PTFE particles in the dispersion, and the PTFE particle aggregate in a string form was obtained successfully even in the cases of the content of 54 mass % and 48 mass %.

Example 5

Figure 7:
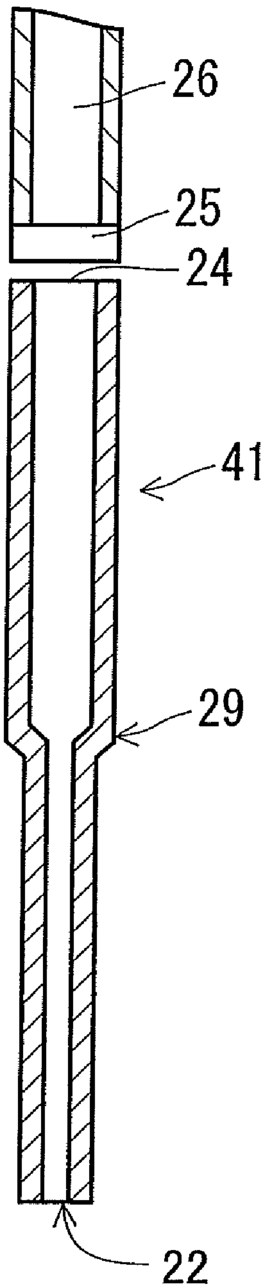
FIG. 7 is a schematic view for illustrating a second pipe used in an Example and a method of forming PTFE particle aggregate with the second pipe.

In Example 5, AD938 manufactured by Asahi Glass Co., Ltd. was used for the dispersion, and PTFE aggregate in a string form was formed with a pipe 41 (a second pipe) shown in FIG. 7. The pipe 41 had a narrowed space 29 having varied inner diameters at the center in the longitudinal direction as a barrier inhibiting the flow of the dispersion. The length of the pipe 41 was 400 mm, and the pipe 41 had the inner diameter of 2 mm in a range from one end 22 to the point 200 mm distant from the one end 22, and had that of 10 mm in a range from the other end to the point 200 nm distant from this end. That is, the pipe 41 has the inner diameters varied from 10 mm to 2 mm at the narrowed space 29.

A nozzle 25 (having a circular spraying orifice (0.15 mmϕ)) disposed at the end of the feeder 26 of the dispersion was located on the central axis of the pipe 41 described above. The nozzle 25 and the pipe 41 were disposed so that the end 24 of the pipe 41 having the inner diameter of 10 mm and the nozzle 25 were 5 mm distant from each other (refer to FIG. 7), and then the dispersion was sprayed inside the pipe 41 from the nozzle 25 at spray pressure of 31 MPa. The amount of the dispersion supplied to the nozzle 25 was approximately 0.5 L/min and the temperature of the dispersion was at a temperature of 25° C.

Several seconds after spraying, PTFE particle aggregate in a string form was discharged from the one end 22 of the pipe 41. The discharged aggregate included water and a surfactant, and successfully maintained the form without a support.

Similar experiments were carried out by varying the spray pressure of the dispersion, and the PTFE particle aggregate in a string form was obtained successfully even in the case of the spray pressure at 25 MPa.

In addition, similar experiments were carried out by varying the content of PTFE particles in the dispersion, and the PTFE particle aggregate in a string form was obtained successfully even in the cases of the content of 54 mass % and 48 mass %.

Comparative Example

In Comparative Example, AD938 manufactured by Asahi Glass Co., Ltd. was employed for the dispersion, and the fabrication of a PTFE sheet with a thickness of 300 μm was attempted by casting.

The dispersion was applied on a surface of an aluminum substrate (application thickness: 600 μm), and the whole was dried at a temperature of 120° C. for 15 minutes, followed by firing at a temperature of 380° C. for 10 minutes. Although PTFE in a sheet form was formed on the substrate, the formed PTFE developed countless cracks and did not successfully separate from the substrate remained in the form of a sheet.

The invention may be embodied in other forms without departing from the spirit or essential characteristics thereof. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

INDUSTRIAL APPLICABILITY

According to the present invention, novel methods of manufacturing PTFE particle aggregate and a PTFE product are provided in which a dispersion of PTFE particles is their starting material. The manufacturing methods of the present invention enable to manufacture PTFE aggregate and a PTFE product with better productivity, and to offer a high degree of flexibility in the forms of the aggregate and the product to be obtained.

The invention claimed is:

1. A method of manufacturing polytetrafluoroethylene particle aggregate, comprising:

providing a dispersion containing water as a dispersion medium, polytetrafluoroethylene particles, and a surfactant, applying a force to the dispersion, the force making particles approach or contact with each other, thereby aggregating the particles to obtain a deformable aggregate comprising polytetrafluoroethylene particles, water and the surfactant, and discharging the obtained aggregate from an outlet of a pipe having a bent portion or a narrowed space, wherein the force is applied in the pipe by spraying the dispersion to an inner wall of the bent portion or the narrowed space of the pipe.

2. The method of manufacturing polytetrafluoroethylene particle aggregate according to claim 1, wherein the dispersion is sprayed from a nozzle.

3. The method of manufacturing polytetrafluoroethylene particle aggregate according to claim 1, wherein the obtained aggregate is discharged from the outlet of the pipe by pressure generated by the spraying of the dispersion.

4. The method of manufacturing polytetrafluoroethylene particle aggregate according to claim 1, wherein the bent portion and the narrowed space have a shape that inhibits a flow of the sprayed dispersion.

5. The method of manufacturing polytetrafluoroethylene particle aggregate according to claim 1, wherein the bent portion is in the shape of the letter L or T.

6. The method of manufacturing polytetrafluoroethylene particle aggregate according to claim 1, wherein the dispersion is sprayed to the pipe continuously and the aggregate is discharged continuously from the pipe.

7. The method of manufacturing polytetrafluoroethylene particle aggregate according to claim 1, wherein the aggregate is discharged substantially in the same mass as that of the sprayed dispersion.

8. The method of manufacturing polytetrafluoroethylene particle aggregate according to claim 1, wherein the method further comprising deforming the aggregate.

9. A method of manufacturing polytetrafluoroethylene particle aggregate, comprising:

providing a dispersion containing water as a dispersion medium, polytetrafluoroethylene particles, and a surfactant, applying a force to the dispersion, the force making particles approach or contact with each other, thereby aggregating the particles to obtain a deformable aggregate comprising polytetrafluoroethylene particles, water and the surfactant, and discharging the obtained aggregate from an outlet of a chamber, wherein the force is applied in the chamber by supplying the dispersion to the chamber, thereby making the dispersion contact a narrowed space that is set in a flow path of the dispersion in the chamber, thus inhibiting a flow of the dispersion at the narrowed space, wherein the narrowed space is a gap between planar surfaces disposed to face each other, an outlet channel is formed in the chamber in such a manner that an end of the channel is open in one of the planar surfaces, and the supplied dispersion flows, at the gap, from the peripheries of the planar surfaces into the end of the channel and is discharged from the chamber through the channel.

10. The method of manufacturing polytetrafluoroethylene particle aggregate according to claim 9, wherein the end of the channel is open at the center of the one of the planar surfaces.

11. The method of manufacturing polytetrafluoroethylene particle aggregate according to claim 9, wherein the external shape of each of the planar surfaces is circle.

12. The method of manufacturing polytetrafluoroethylene particle aggregate according to claim 9, discharging the obtained aggregate that has a shape corresponding to the shape of the outlet channel.

13. The method of manufacturing polytetrafluoroethylene particle aggregate according to claim 9, wherein the dispersion is supplied to the chamber continuously and the aggregate is discharged continuously from the chamber.

14. The method of manufacturing polytetrafluoroethylene particle aggregate according to claim 9, wherein the aggregate is discharged substantially in the same mass as that of the supplied dispersion.

15. The method of manufacturing polytetrafluoroethylene particle aggregate according to claim 9, wherein the method further comprising deforming the aggregate.

* * * * *